United States Patent [19]

Dorr

[11] 4,388,041
[45] Jun. 14, 1983

[54] ROTATING SAIL FLUID CURRENT MOTOR

[76] Inventor: Ralph Dorr, 316 Southland Dr., Danville, Va. 24541

[21] Appl. No.: 184,778

[22] Filed: Sep. 8, 1980

[51] Int. Cl.³ .............................................. F03D 3/02
[52] U.S. Cl. ..................................... 416/119; 416/66; 416/132 B; 416/81; 415/141
[58] Field of Search ....................... 416/66, 79, 81, 83, 416/132 B, 240 A, 119; 415/141; 417/436

[56] References Cited

U.S. PATENT DOCUMENTS

| 535,504 | 3/1895 | Milliken | 416/81 |
|---|---|---|---|
| 1,265,137 | 5/1918 | Tayloe | 416/44 A |
| 1,793,748 | 2/1931 | Pressnall | 416/119 X |
| 1,804,493 | 5/1931 | Benjamins | |
| 2,752,860 | 7/1956 | Waldin | 416/81 X |
| 3,093,194 | 6/1963 | Rusconi | |
| 3,884,176 | 5/1975 | Riddle | 416/81 X |
| 3,981,612 | 9/1976 | Bunger et al. | 416/83 X |
| 4,097,190 | 6/1978 | White | 416/117 |

FOREIGN PATENT DOCUMENTS

| 487136 | 10/1952 | Canada | 416/119 |
|---|---|---|---|
| 443893 | 1/1949 | Italy | 416/119 |
| 19046 | of 1909 | United Kingdom | 416/119 |

Primary Examiner—Everette A. Powell, Jr.
Attorney, Agent, or Firm—B. B. Olive

[57] ABSTRACT

A fluid operated motor utilizes one or more flexible rectangular sails and associated supporting frames, sail guides and drive apparatus enabling each of the sails to cyclically fold and unfold, drive the sail supporting frames and provide a source of power when placed in a moving stream of fluid such as in a wind stream, river or gas stack.

9 Claims, 12 Drawing Figures

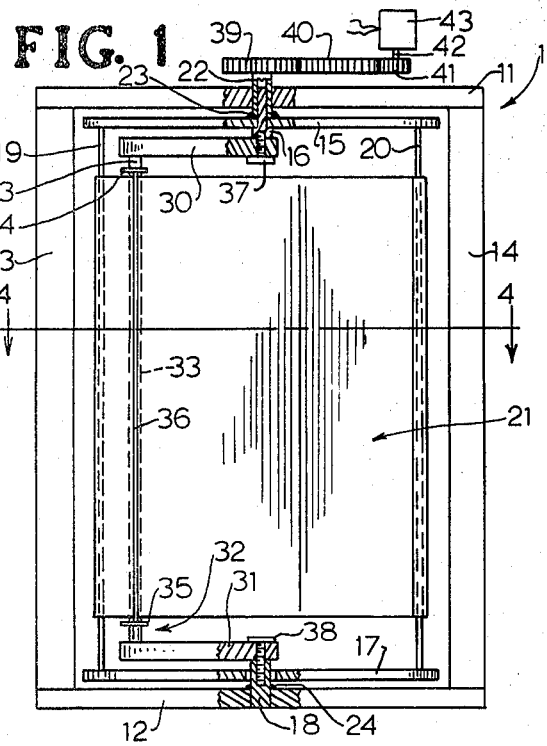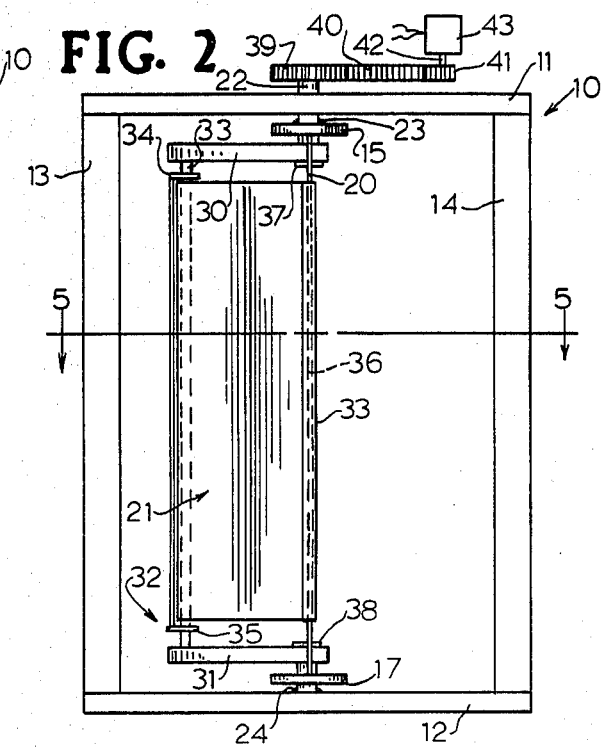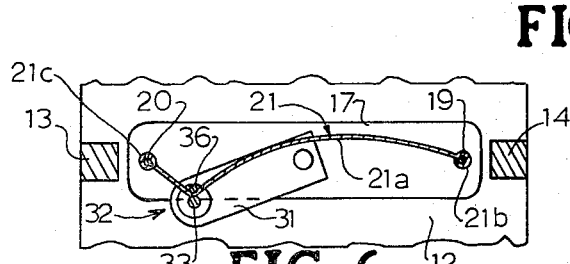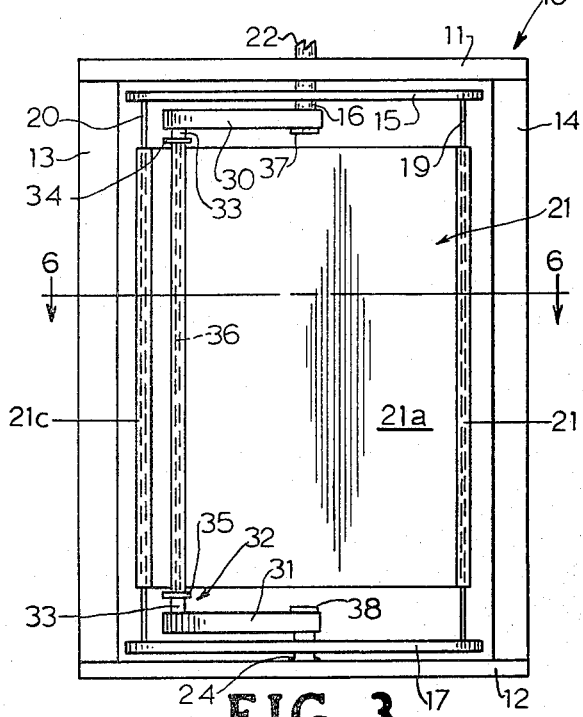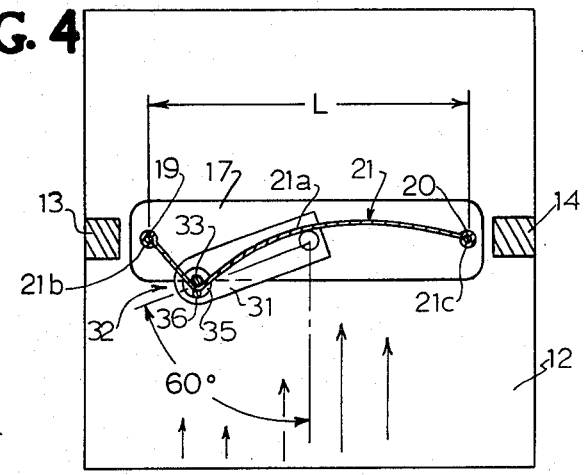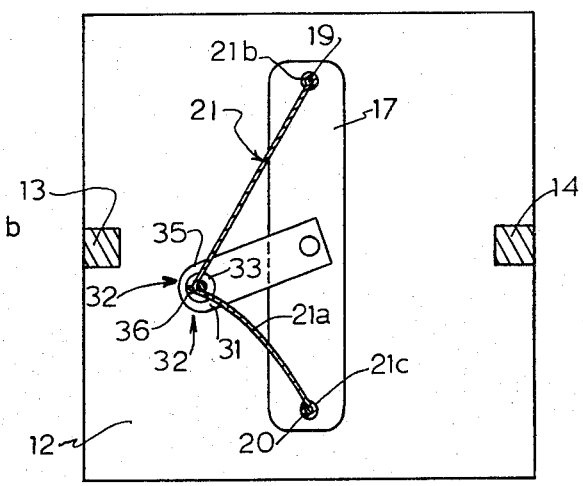

ROTATING SAIL FLUID CURRENT MOTOR

TECHNICAL FIELD

This invention relates to fluid current motors of the type using sails to produce continuous rotation of a drive shaft when placed in a fluid current such as produced by wind, water, or gas.

BACKGROUND ART

The threat of a rapidly diminishing supply of fossil fuels has brought about a renewed interest in windmills and other fluid current motor devices. As windmill blades depend on a pitch angle to achieve rotation by the wind, the full force of a head wind can never be captured by the blades. Another limitation to the power producing capability of the conventional windmill is the limited amount of wind-bearing surface that can practically be provided on the blades. A further limitation is the wind drag loads created on the blades. These loads increase with increasing revolutions per minute and though the loads may be diminished somewhat by mechanisms that change the pitch angle of the blades for varying wind conditions, the drag load still exists.

Wind-driven devices have in the past operated in some applications around a vertical axis and in other applications around a horizontal axis. Mention is made of the distinction between vertical and horizontal axis-type devices because the present invention while adapted for operating in either a horizontal axis mode or a vertical axis mode is illustrated for vertical axis rotation for which it is deemed best suited.

U.S. Pat. Nos. 1,804,493; 3,093,194; 3,995,170; 4,115,027; 4,134,708; 4,142,822; 4,177,014; 4,197,055; and British Pat. No. 7176 are generally illustrative of wind-driven vertical axis devices. U.S. Pat. No. 2,542,522 is illustrative of a horizontal axis wind impeller and U.S. Pat. No. 4,137,005 illustrates an ocean wave driven apparatus operating with a horizontal drive axis.

Machines which utilize hydraulic force to perform work commonly take advantage of the weight or pressure of a liquid opposed by atmospheric pressure and converts this unbalanced force into rotary mechanical motion by waterwheels, turbines, or the like. The operation of these devices generally depend on a natural occurrence or the man-made creation of conditions that will allow a liquid to flow from a higher to a lower elevation. Whenever such conditions are either enhanced or created by man-made structures, such as dams or weirs, the task is often accomplished at enormous expense and at considerable risk of undesirable and irreversible environmental changes.

With the foregoing in mind, the present invention has as its general object that of providing a fluid current motor which may be employed with wind, water, or gas, i.e., generally with any type of fluid current, and with nonrigid sails so as to eliminate the need for windmill-type blades. The present invention also has as an object that of eliminating the need for dams, weirs, pipes, or other channeling devices in conjunction with employment of a fluid current motor in a stream, river, or ocean application, for example. Also, a further object is that of providing a fluid current motor adapted to capture substantially the full force of a fluid current to produce rotary motion and also to provide substantial fluidbearing surface with minimal drag.

DISCLOSURE OF INVENTION

The fluid current motor of the present invention while adapted for operation around either a vertical axis or a horizontal axis is illustrated in two embodiments for operation around a vertical axis. In the illustrated embodiments, one or more open, rectangular frames are supported for rotation around a vertical axis. Each frame provides means for loosely supporting the ends of a flexible, rectangular sail with the plane of the sail in a vertical orientation. A fixed vertical sail guide device operates in conjunction with each frame for guiding the sail as it slides over the guide device. The amount of sail surface area as well as the side of the sail exposed to the fluid flow is caused to change cyclically and each frame and its corresponding sail is thus caused to rotate and provide a mechanical drive source when the fluid motor is appropriately positioned in a fluid stream as, for example, in a stream of wind or water.

In one illustrated embodiment, a single sail, single sail frame and single sail guide are employed. In another embodiment, two sails are employed in a pair of frames and with a sail guide device arranged so as to guide both sails simultaneously. Both embodiments are illustrated with means for using the frames to mechanically drive other apparatus such as a pump, electric generator or the like. Means are also illustrated enabling the sail guide to be adjustably positioned according to the direction of the fluid, e.g., wind direction, for maximum efficiency. In one embodiment, the sail guide is adjusted by a wind vane and in another embodiment by a positionable motor such as used in remote positioning of a television antenna.

DESCRIPTION OF THE DRAWINGS

FIG. 1 is side elevation view of a first embodiment of the invention fluid motor suited, for example, to wind operation and using a single sail in a single frame rotating around a vertical axis to drive a schematically illustrated power takeoff apparatus.

FIG. 2 is a side elevation view of the FIG. 1 fluid motor but with the frame rotated 90 degrees from the FIG. 1 position.

FIG. 3 is a side elevation view of the FIG. 1 motor but with the frame and its sail rotated 180 degrees from the FIG. 1 position.

FIG. 4 is a section view taken substantially along line 4—4 of FIG. 1.

FIG. 5 is a section view taken substantially along line 5—5 of FIG. 2.

FIG. 6 is a fragmentary section view taken substantially along line 6—6 of FIG. 3.

BEST MODE FOR CARRYING OUT THE INVENTION

Figure 7:
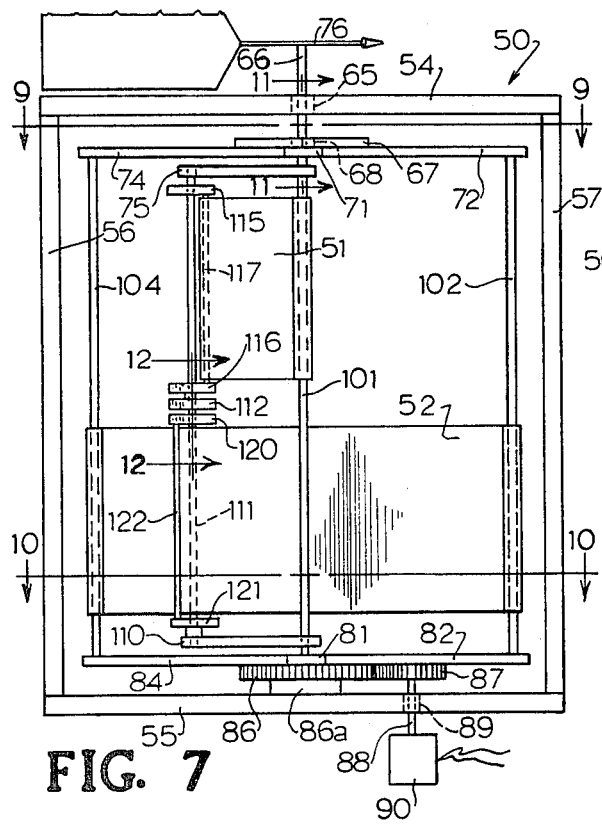
FIG. 7 is a side elevation view of a second embodiment of the invention fluid motor utilizing a pair of frames and sails oriented perpendicular to each other and illustrated with a "wind-vane" arrangement for aligning the sails for most efficient operation.

Making reference initially to FIGS. 1 through 6 of the drawings, there is shown a vertically-oriented, single sail, fluid-operated motor 10 with wind operation being used by way of example. From the description to follow, it will be understood that fluid current motor 10 is also adapted for operating in other fluid mediums such as in a stream of water or gas.

Fluid motor 10 is basically made up of an outer frame which is fixed in the fluid stream during operation of the motor, an inner frame which supports the sail and rotates within the outer frame, an adjustable sail guide which orients the sail for maximum operating efficiency and a power take-off train which enables the rotation of the inner frame to be used as a source of power for driving a generator, pump, or the like.

The mentioned outer support frame which is fixed during operation in the fluid stream is made up of a horizontally positioned top frame plate 11, an opposing bottom frame plate 12 and integrally secured vertical post members 13, 14. The inner rotating sail mounting frame comprises a horizontal arm 15 made integral with hollow shaft 22 by weld 23 and which is rotatably mounted adjacent top frame plate 11 on vertical shaft 16 which is within shaft 22, an opposing lower arm 17 rotatably mounted adjacent bottom frame plate 12 on vertical stub shaft 18, which is integrally secured to plate 12 by weld 24, and vertical sail mounting rods 19, 20 extending between arms 15 and 17 at the outer ends thereof and integrally secured thereto.

A flexible, rectangular sail member 21 is made up of a central panel 21a and tubular formed ends 21b, 21c loosely mounted on the previously mentioned sail support rods 19, 20 forming part of the rotating inner frame. Sail member 21, in addition to being thin and flexible, should preferably be made of a tough, wear-resistant material with sail fabric, reinforced polyethylene sheet, tarpaulin fabric, various coated fabrics, and the like, being deemed suitable for the purpose.

From the foregoing description, it will be understood that the sail member 21, when operated on by the fluid, e.g., the wind, will rotate with the inner sail mounting frame made up of arms 15, 17 and rods 19, 20. The length of sail between the tubular ends 21b, 21c is purposely made in excess of the distance L between rods 19, 20 in order that sail member 21 can always operate in a somewhat slack condition so as to be able to flex and curve under the influence of the fluid force. In one example, the overall length of sail supported between rods 19, 20 exceeded the distance L by about 20%. The actual amount of sail slack and the shape of the sail exposed to the fluid flow is controlled to a great extent by what is referred to as the sail guide mechanism.

The sail guide mechanism comprises a pair of horizontal arm members 30, 31 having a vertical sail guide rod 33 fixed therebetween. Arm member 30 is supported on shaft 16 and is adjustably secured by means of a threaded bolt 37. Similarly, arm member 31 is mounted on shaft 18 and is adjustably secured by means of a threaded bolt 38. Thus, the angle at which arm members 30, 31 are positioned with respect to the wind can be controlled by tightening and loosening the mentioned bolts 37 and 38.

During operation, the inner frame and thus the sail mounting rods 19, 20 will rotate around the central vertical axis passing through shafts 16, 18. As this rotating action takes place, the sail panel 21a will thus slide on fixed rod 33 held between arms 30 and 31. Additional means are provided both to assist in this sliding and guiding operation as well as to assure that the guided portion of the sail 21 is always retained on sail guide rod 33. This additional sail guide structure, referred to as wiper guide 32, comprises discs 34, 35 which are rotatably mounted on rod 33 and in turn are spaced apart and support an additional sail guide rod 36. The previously-mentioned central sail panel 21a of sail member 21 thus passes between the fixed guide rod 33 and the rotating guide rod 36 of wiper guide 32. Thus, as the inner frame made up of arms 15, 17 and rods 19, 20 rotates on shafts 16, 18, the central sail panel 21a will be guided between fixed rod 33 and rotating rod 36 of wiper guide 32 and wiper guide 32 will thus rotate on rod 33 as the inner frame and sail member 21 rotate together around the central vertical axis passing through shafts 16, 18.

The angle at which arms 30 and 31 are set will be determined by the manner in which fluid current motor 10 is oriented with respect to the wind, being used as an example, and the actual direction of the wind. With the wind coming head-on into motor 10 and motor 10 positioned as illustrated in FIG. 4, it has been found desirable to set the arms 30, 31 at approximately 60° from the wind flow direction, as illustrated in FIG. 4, in order to maximize the amount of energy which can be extracted from the flowing wind.

With arms 30, 31 appropriately positioned, the wind is directed into motor 10 and trapped by sail member 21. FIGS. 1 and 4 illustrate one position of sail member 21 and its supporting inner frame whereas FIGS. 2 and 5 illustrate the inner frame rotated 90° counterclockwise and with a corresponding rotation of sail member 21 as well as a corresponding rotation of wiper guide 32 about rod 33. FIGS. 3 and 6 illustrate the inner frame rotated 180° with respect to the positions of FIGS. 1 and 4 or 90° with respect to the position shown in FIGS. 2 and 5 and with corresponding positions of sail member 21 and wiper guide 32.

From the foregoing description, it will be seen that sail member 21 is caused to catch and spill the wind in a continuous repetitive cycle as the inner frame rotates. During this repetitive operation, it will also be seen that guide rod 36 and discs 34, 35 comprising the wiper guide 32 will also rotate continuously around the fixed guide rod 33 as the central panel 21a of sail member 21 slides back and forth and around the sail guide rod 33.

The primary purpose of fluid motor 10 is, of course, to provide a source of power utilizing the energy contained in the wind. For this purpose, the short vertical rotating shaft 22 is mounted concentric with adjustably secured shaft 16 and as previously mentioned is secured at its bottom end to bar member 15 by weld 23 so as to rotate therewith. The upper end of shaft 22 mounts a drive gear 39 which meshes with an intermediate gear 40 to drive another gear 41 having a shaft 42 connected to a driven apparatus 43 which may be an electrical generator as illustrated, a pump or other mechanically-driven device. Thus, as sail member 21 is operated on by the wind, the inner frame rotates, bar member 15 drives shaft 22 and through the innerconnected gear train made up of gears 39, 40 and 41 drives the driven device 43 through shaft 42 thereby using the wind or other fluid as the source of power as intended by the invention.

The second embodiment of the invention is next described with reference to FIGS. 7 through 12. As compared to the first embodiment described in FIGS. 1 through 6 in which a single sail and a single inner rotating frame is mounted within an outer support frame, the second embodiment is directed to employment of a pair of sails mounted within a pair of rotating inner frames which in turn are mounted within an outer frame. Thus, with the second embodiment there is a sequential presentation of sail surface area first with respect to one sail and then with respect to the other sail in a continuing sequence. As with the first embodiment, there is an outer frame which is mounted in the fluid, i.e., in the wind stream. The pair of sails associated with the second embodiment are supported on a pair of inner vertical frames arranged perpendicular to each other and which rotate together with the sails within the outer frame.

As with the first embodiment, the second embodiment also employs a sail guide which is adjustably positioned to correspond to the direction of wind flow and which guides intermediate portions of the respective pair of sails as the inner frames and pair of sails rotate during operation of the second embodiment fluid current motor.

With more specific reference to FIGS. 7 through 12, the outer frame of the second embodiment fluid current motor 50 is composed of a pair of oppositely disposed horizontal top and bottom frame plates 54, 55 integrally secured to vertical post members 56, 57, 58 and 59. The pair of inner sail support frames comprise a set of horizontal upper arms 71–74 secured to plate 67, a set of oppositely disposed lower arms 81–84 secured to gear 86 mounted on thrust bearing 86a and a set of integrally secured sail support rods 101–104. The pair of sail members 51, 52 are formed with tubular end portions as previously described with reference to the first embodiment and are thus loosely mounted on the respective sail support rods 101–104 as illustrated in the drawings. The length of each sail is also purposely made longer than the space between the respective pair of sail support rods on which the sail is supported. Thus, for example, the length of sail member 52 shown in FIG. 7 exceeds the space between the sail support rods 102, 104. As an example, the length of sail 52 may be 20% longer than the distance between the corresponding sail support rods 102, 104.

As with the first embodiment, the second embodiment incorporates a sail guide mechanism. However, unlike the first embodiment in which the sail guide mechanism is manually adjusted according to wind direction, the second embodiment, FIG. 7, illustrates a wind vane type arrangement in which the sail guide can be automatically adjusted by the wind according to wind direction. There is also illustrated another sail guide mechanically adjusted mechanism, FIG. 8, in which the position of the sail guide can be remotely controlled using a positionable motor such as used with remotely controlled television and radio antennas.

Figure 8:
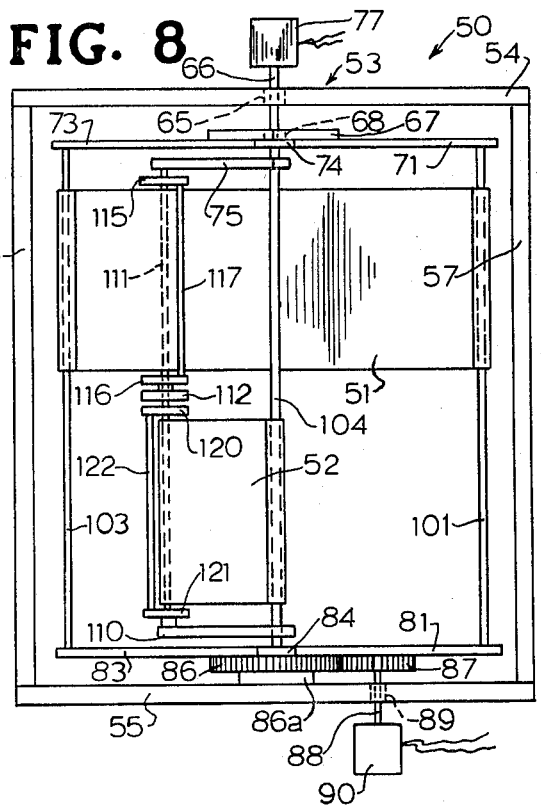
FIG. 8 is a side elevation view of the two-sail fluid motor of FIG. 7 but with the frames rotated 90 degrees from the FIG. 7 position and schematically illustrating an arrangement for remotely adjusting the sail alignment for maximum efficiency.
Figure 9:
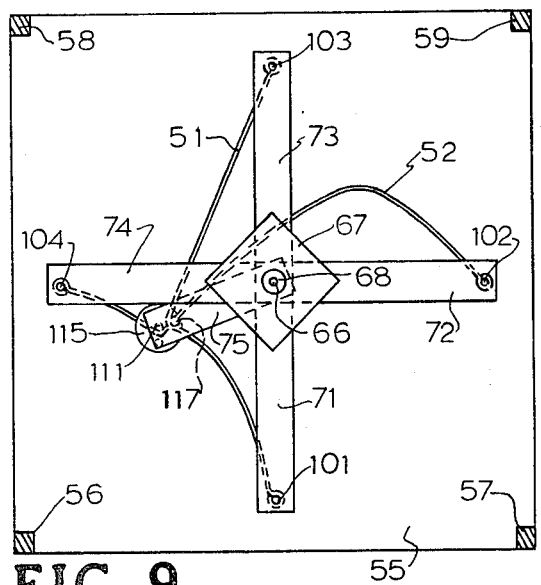
FIG. 9 is a section view taken substantially along line 9—9 of FIG. 7.
Figure 10:
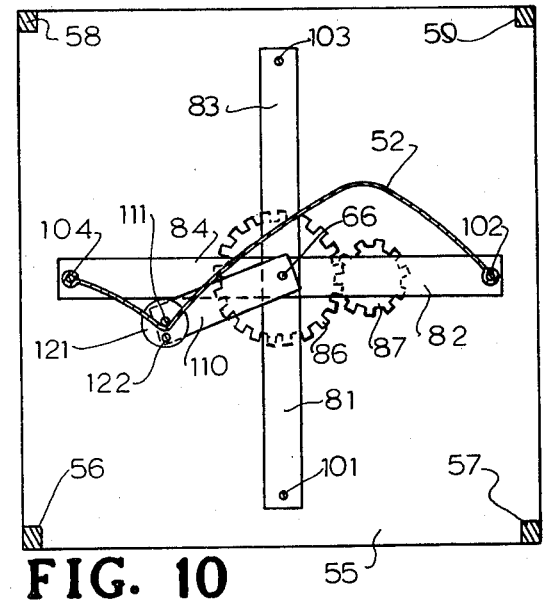
FIG. 10 is a section view taken substantially along line 10—10 of FIG. 7.
Figure 11:
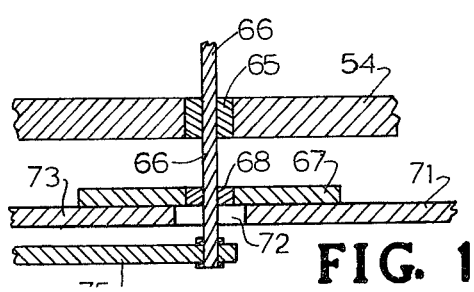
FIG. 11 is an enlarged, fragmentary, section view taken substantially along line 11—11 of FIG. 7 and illustrating in more detail the "wind-vane" sail adjustment mechanism.
Figure 12:
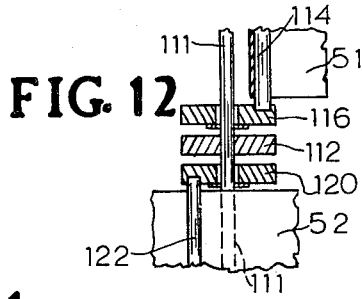
FIG. 12 is an enlarged, fragmentary, section view taken substantially along line 12—12 of FIG. 7 and illustrating the sail guide mechanism.

With specific reference to the sail guide mechanism associated with the second embodiment, it may be noted that a bearing 65 mounted in top frame plate 54 is aligned with a similar bearing 68 mounted in rotating plate 67 for mounting a shaft 66 which passes through the pair of bearings. Shaft 66 may mount a wind vane 76 as seen in FIG. 7 or a positionable remotely controllable motor 77 as seen in FIG. 8 such that the position of shaft 66 can be controlled either by the wind vane 76 (FIG. 7) or by the controllable motor 77 (FIG. 8). The sail guide mechanism thus becomes adjustable with respect to wind direction by means of rotating shaft 56 to bring the sail guide mechanism into the appropriate position for the prevailing wind direction.

The sail guide mechanism for the second embodiment comprises an upper adjustment arm 75 located opposite a lower adjustment arm 110 between which extends a guide rod 111. Adjustment arms 75, 110 are secured to shaft 66. Thus, the position of sail guide rod 111 is determined by the position of shaft 66 which, in turn, is positioned either by the weather vane arrangement illustrated in FIG. 7 or the remotely controllable motor arrangement illustrated in FIG. 8. Sail member 51, in addition to being guided by rod 111 is also guided and confined by a wiper guide arrangement comprising discs 115, 116 joined by rod 117. Sail member 52 is similarly guided a wiper guide arrangement consisting of discs 120, 121 with an integrally secured guide rod 122 with sail member 52 being guided between rods 111 and 122. As with the wiper guide arrangement previously described in connection with the first embodiment, it will be understood that the sail guide rods 117, 122 rotate around the fixed guide rod 111 during operation of the fluid motor 50. A spacer member 112 is secured to rod 111 as a means of maintaining appropriate spacing between the two sails 51, 52 during operation of fluid motor 50.

As with the first embodiment, the ultimate purpose of the fluid current motor 50 of the second embodiment is to provide a source of power. In this regard, gear 86 rotates on thrust bearing 86a mounted on plate 55 and has its upper surface secured to lower arms 81–84. Gear 86 is aligned with and rotates about shaft 66 but shaft 66 and gear 87 are physically separated so that shaft 66 can control the positioning of arms 75, 110 while the inner frames rotate around shaft 66 and drives gear 86. At the same time, as the inner frames rotate to drive gear 86, gear 86 meshes with a second gear 87 which through shaft 88 passing through bearing 89 in bottom frame plate 55 drives device 90 illustrated as an electric generator. Alternatively, the driven device 90 might be a water pump or other mechanically rotated device.

During operation of fluid motor 50, the sail members 51, 52 will catch and spill the wind in sequence so as to drive the inner frames and thereby drive the driven device 90. Efficient operation of fluid motor 50 is achieved through alignment of the sails 51, 52 either by the wind vane 76 (FIG. 7) or by the remotely controllable motor 77 (FIG. 8) so as to always maintain the sail guide rod 111 in the most effective position for catching and spilling of the wind.

From the foregoing, it can be seen that a unique and versatile fluid driven motor has been provided with application to a wide range of fluid drive conditions. While a pair of sail drive members have been illustrated, it will, or course, be appreciated that the number of sails could be multiplied according to the application. Thus, there is provided a fluid driven motor which can be scaled up or scaled down according to the application needs.

I claim:

1. A fluid-powered motor, comprising:
   (a) outer frame means adapted for fixed placement in a fluid stream and further adapted for mounting a selected number of inner frames rotatable about an axis passing through the outer frame means and located midway between and parallel to a pair of opposed sides of each said inner frame;

(b) a selected number of flexible, rectangular sails;

(c) a number equal to said selected number of inner frames, each said inner frame having a central axis passing through said outer frame means and located on the inner frame midway between and parallel to a pair of opposed sides thereof and comprising the axis about which each such inner frame is rotatably mounted on said outer frame and each said inner frame pivotally supporting on and extending between said opposed sides a respective said sail widthwise by the ends thereof with some predetermined slack and oriented for being operated on by said fluid;

(d) sail guide means adjustably secured to and positionable relative to said outer frame means and within the space in which said number of inner frames rotate and providing a linear guide surface spanning and continuously engaging the width of each said sail intermediate the length thereof without obstructing rotation of said number of inner frames whereby with said outer frame means appropriately fixed in a selected stream of fluid moving in a given direction, said guide means is adapted to be adjustably positioned with respect to said outer frame means to control the curvature and area of each sail exposed to particular portions of said fluid in various rotative positions of each respective said inner frame thereby with said guide means fixed in an optimum position enabling constantly changing portions of the surfaces and sides of each said sail under the influence of the force of said fluid to cyclically curve and thereby drive and rotate each said inner frame; and (e) drive apparatus connected to be driven by each said inner frame during rotation thereof.

2. A fluid-powered motor as claimed in claim 1 wherein said outer frame means comprises a rectangular frame means, each said inner frame is rectangular and is mounted for rotation about a said central axis extending through said outer frame means, each said sail is supported on a respective said inner frame with the ends thereof formed for being mounted and rotating on support rods forming part of the respective said inner frame on which such sail is mounted, said rods being spaced outwardly from and parallel to said central axis and with said sail guide means guide surface engaging each said sail along a guideline parallel to said central axis and laterally offset therefrom.

3. A fluid-powered motor as claimed in claim 1 wherein said number of sails comprise a single sail.

4. A fluid-powered motor as claimed in claim 1 wherein said sail guide means includes a shaft-mounted vane adapted to be placed in the fluid stream and operatively associated with and adapted to control the positioning of said sail guide means according to the direction of said fluid with respect to said outer frame.

5. A fluid-powered motor as claimed in claim 1 wherein said sail guide means includes a remotely controllable positionable electric motor with a drive shaft operatively associated with and adapted to control the positioning of said sail guide means whereby said sail guide means may be remotely positioned by controlling the position of said positionable motor.

6. A fluid-powered motor as claimed in claim 1 wherein said sail guide means includes mechanically adjustable tightening means operative on said sail guide means for controlling the position thereof.

7. A fluid-powered motor as claimed in claim 2 wherein said central axis is vertical.

8. A fluid-powered motor as claimed in claim 2 wherein said sail guide means includes for each said sail a first guide rod adjustably secured proximate said guideline and a second guide rod parallel, proximate to and rotatable about said first guide rod wherein each said sail is guided by being loosely held between a respective said first and second guide rod and effects rotation of such second guide rod about said first guide rod in correspondence with rotation of the said number of inner frames.

9. A fluid-powered motor as claimed in claim 2 wherein said inner frame means comprises a pair of inner frames arranged in a perpendicular orientation and rotatable about said central axis, said number of sails comprise a pair of sails separately mounted in said pair of inner frames and said sail guide means includes a first guide rod adjustably secured approximate said guideline and arranged to span and engage the width of each said sail, said sail guide means further including for each said sail a separate second guide rod parallel, proximate to and rotatable about said first guide rod wherein each said sail is guided by being loosely held beteen said first guide rod and a respective said second guide rod and whereby each respective sail effects rotation of a respective said second guide rod about said first guide rod in correspondence with rotation of said pair of inner frames.

* * * * *